(12) United States Patent
Shao et al.

(10) Patent No.: US 11,874,647 B2
(45) Date of Patent: *Jan. 16, 2024

(54) INDUSTRIAL INTERNET OF THINGS SYSTEM FOR CONTROLLING PRODUCTION LINE PARAMETER AND CONTROL METHODS THEREOF

(71) Applicant: CHENGDU QINCHUAN IOT TECHNOLOGY CO., LTD., Sichuan (CN)

(72) Inventors: Zehua Shao, Chengdu (CN); Yaqiang Quan, Chengdu (CN); Haitang Xiang, Chengdu (CN); Yong Li, Chengdu (CN); Xiaojun Wei, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/064,943

(22) Filed: Dec. 13, 2022

(65) Prior Publication Data
US 2023/0109993 A1  Apr. 13, 2023

Related U.S. Application Data

(63) Continuation of application No. 17/807,718, filed on Jun. 18, 2022, now Pat. No. 11,579,593.

(30) Foreign Application Priority Data

Apr. 14, 2022  (CN) .......................... 202210389942.8

(51) Int. Cl.
G05B 19/418 (2006.01)

(52) U.S. Cl.
CPC ..... *G05B 19/4183* (2013.01); *G05B 19/4185* (2013.01); *G05B 19/41815* (2013.01); *G05B 19/41865* (2013.01)

(58) Field of Classification Search
USPC .......................................................... 700/95
See application file for complete search history.

(56) References Cited

U.S. PATENT DOCUMENTS 6,094,416 A    7/2000  Ying
7,379,782 B1 * 5/2008  Cocco .................... G06Q 10/06
                                                          703/2

(Continued)

FOREIGN PATENT DOCUMENTS

CN    105306560 A  *  2/2016
CN    106779316 A     5/2017

(Continued)

OTHER PUBLICATIONS

Shao, Zehua, Exploration and Research on the Structure of Internet of Things, Internet of Things Technologies Reliable Transmission, 2015, 10 pages.

(Continued)

*Primary Examiner* — Hien D Khuu
(74) *Attorney, Agent, or Firm* — METIS IP LLC

(57) ABSTRACT

The present disclosure relates to an Industrial Internet of Things (IoT) system for controlling a production line parameter and a control method thereof. The Industrial IoT system includes an user platform, a service platform, a management platform, a sensor network platform, and an object platform interacting in sequence, the service platform adopts a centralized arrangement, the management platform adopts an independent arrangement, and the sensor network platform adopts a rear sub-platform arrangement.

12 Claims, 5 Drawing Sheets

(56) References Cited

U.S. PATENT DOCUMENTS

| | | |
|---|---|---|
| 10,575,072 B1 * | 2/2020 | Shao .................. H04Q 9/00 |
| 2002/0094588 A1 * | 7/2002 | Fan .............. G05B 19/41865 |
| | | 700/95 |
| 2002/0143951 A1 | 10/2002 | Khan et al. |
| 2007/0133469 A1 | 6/2007 | Shin et al. |
| 2014/0119204 A1 | 5/2014 | Guo et al. |
| 2020/0274730 A1 | 8/2020 | Schlautmann et al. |
| 2020/0326684 A1 * | 10/2020 | Chand ............ G05B 19/41865 |
| 2022/0058152 A1 | 2/2022 | Seger, Jr. et al. |

FOREIGN PATENT DOCUMENTS

| | | | |
|---|---|---|---|
| CN | 108734237 A | | 11/2018 |
| CN | 109861389 A | | 6/2019 |
| CN | 111026055 A | | 4/2020 |
| CN | 112836976 A | | 5/2021 |
| CN | 113141381 A | | 7/2021 |
| CN | 113534760 A | | 10/2021 |
| CN | 114253232 A | * | 3/2022 |
| EP | 0859299 A2 | | 8/1998 |
| EP | 3719646 A1 | | 10/2020 |
| JP | H06-168006 | * | 6/1994 |
| JP | H06168006 A | | 6/1994 |
| JP | 2003008619 A | | 1/2003 |
| JP | 2008217451 A | | 9/2008 |
| JP | 2015014895 A | | 1/2015 |
| JP | 2018129613 A | | 8/2018 |
| WO | WO-2018199731 A1 | * | 11/2018 |
| WO | 2020227429 A1 | | 11/2020 |

OTHER PUBLICATIONS

Shao, Zehua, Chapter 2 Architecture of Internet of Things, The Internet of Things sense the world beyond the world, China Renmin University Press, 2017, 30 pages.

Shao, Zehua, Smart City Architecture, Internet of Things Technologies Intelligent Processing and Application, 2016, 7 pages.

White Paper on Urban Brain Development, Smart City Standard Working Group of National Beacon Commission, 2022, 59 pages.

Jin, Qiuping et al., Chapter 7.6 The Internet of Things, University Information Technology Fundamentals (Third Edition), National Defense Industry Press, 2015, 27 pages.

First Office Action in Chinese Application No. 202210389942.8 dated May 23, 2022, 12 pages.

Notification to Grant Patent Right for Invention in Chinese Application No. 202210389942.8 dated May 30, 2022, 3 pages.

Zhang, Xiwen et al., Simulation and Optimization of Helicopter Composite Main Blade Production Line Based on DELMIA/Quest, IEEE Interrnational Conference on Electrical Engineering, 499-506, 2022.

* cited by examiner

INDUSTRIAL INTERNET OF THINGS SYSTEM FOR CONTROLLING PRODUCTION LINE PARAMETER AND CONTROL METHODS THEREOF

CROSS-REFERENCE TO RELATED DISCLOSURES

This application is a Continuation of U.S. patent application Ser. No. 17/807,718 filed on Jun. 18, 2022, which claims priority to Chinese Patent Application No. 202210389942.8, filed on Apr. 14, 2022, the entire contents of which are hereby incorporated by reference.

TECHNICAL FIELD

The present disclosure relates to intelligent manufacturing technology, and in particular, to an Industrial Internet of Things (IoT) system and a method for controlling a production line parameter.

BACKGROUND

Production line balancing is technical means and method of averaging all the production processes and adjusting the workload so that each work time is as close as possible, which aims to eliminate unbalanced efficiency losses between operations and overproduction. Production line balancing is a great knowledge, which is directly related to normal use of the production line. In industrial applications, the production line balance rate or the balance loss rate are used to indicate the quality of the production line balancing.

In the prior art, in general, the higher the production line balance rate is, the higher the production line balancing is, the higher the overall efficiency of the production line is, and the shorter the waiting time of each workstation of the production line is. However, considering issues such as cost, product output, and workload intensity of production line equipment, in practical applications, it is not necessary to use the higher production line balance rate since it will lead to many questions, such as increased manufacturing costs, overcapacity, or heavy equipment load, etc.

Therefore, under different production backgrounds, it is necessary to adjust the manufacturing parameters of the production equipment in the production line, thereby adjusting the production line balance rate to suit the required production requirements. In the prior art, it is necessary to manually collect the working hours of each production line equipment, obtain the bottleneck time through a software, then obtain the production line balance rate through manual conversion, then adjust the manufacturing parameters of each production line equipment through the production line balance rate, and finally obtain a new production line balance rate through collecting the data again to verify whether the new production line balance rate meets the production requirements. When there are many production line equipment, not only is it time-consuming and labor-intensive to collect the working hours, but also it is prone to errors and the amount of data is large, and the new production line balance rate needs to be recalculated after subsequent adjustments, which further increases the time and cost. There is no guarantee that the new production line balance rate meets the production requirements, and further verification is required. Not only is the process tedious and the workload is heavy, but also it will also affect the actual manufacturing operations.

Therefore, with the increasingly perfect intelligent manufacturing technology, how to use intelligent manufacturing technology to solve the above technical problems quickly and at low cost is an urgent need to solve.

SUMMARY

The technical problem to be solved by the present disclosure is to provide a combined Industrial Internet of Things (IoT), which can realize data collection and data processing of multiple production lines through a reasonable architecture design, and quickly obtain the production line production line balance rates. In the process of the data collection and the data processing, the data of each production line is classified for control and the data processing, which reduces the overall data processing capacity of the IoT, which can achieve fast and accurate collection of the production line balance rates.

One or more embodiments of the present disclosure provide an Industrial IoT system for controlling a production line parameter. The Industrial IoT system includes a user platform, a service platform, a management platform, a sensor network platform, and an object platform interacting in sequence. The service platform adopts a centralized arrangement, the management platform adopts an independent arrangement, the sensor network platform adopts a rear sub-platform arrangement. The independent arrangement is that the management platform uses different platforms for data storage, data processing, or data transmission for data of different object platforms. The rear sub-platform arrangement is that the sensor network platform is provided with a main platform and a plurality of sub-platforms, and the plurality of sub-platforms respectively store and process data of different types or different receiving objects sent by the management platform, and the main platform stores and processes the data of the plurality of sub-platforms after summarizing and transmits the data to the object platform. The centralized arrangement is that the service platform uniformly receives data, uniformly processes data, and uniformly sends data. The object platform is configured with a number of parallel production lines with a same configuration, each production line includes a number of continuous production line equipment, and each production line equipment is equipped with a data collector. The sensor network platform receives working hour data of the production lines from the data collectors, and sends the working hour data to the management platform. The management platform classifies the production line equipment into a plurality of workstations according to process positions of the production lines; determines working hour data of the plurality of workstations based on the working hour data of the production lines; determines production line balance rates based on the working hour data of the plurality of workstations; and sends the production line balance rates to the user platform through the service platform.

One or more embodiments of the present disclosure provide a method of an Industrial Internet of Things (IoT) system for controlling a production line parameter. The IoT system including comprising: a user platform, a service platform, a management platform, a sensor network platform and an object platform interacting in sequence. The service platform adopts a centralized arrangement, the management platform adopts an independent arrangement, the sensor network platform adopts a rear sub-platform arrangement. The independent arrangement is that the management platform uses different platforms for data storage, data processing, or data transmission for data of different object platforms. The rear sub-platform arrangement is that the sensor network platform is provided with a main platform and a plurality of sub-platforms, and the plurality of sub-platforms respectively store and process data of different types or different receiving objects sent by the management platform, and the main platform collects and stores and processes the data of the plurality of sub-platforms, and transmits the data to the object platform. The centralized arrangement is that the service platform uniformly receives data, uniformly processes data, and uniformly sends data. The method comprises: the object platform being configured with a number of parallel production lines with a same configuration, each production line includes a number of continuous production line equipment, and each production line equipment is equipped with a data collector; the sensor network platform receiving working hour data of the production lines from the data collectors, and sending the working hour data to the management platform; the management platform classifying the production line equipment into a plurality of workstations according to process positions of the production lines; determining working hour data of the plurality of workstations based on the working hour data of the production lines; determining production line balance rates based on the working hour data of the plurality of workstations; and sending the production line balance rates to the user platform through the service platform.

Compared with the prior art, the beneficial effects of the present disclosure includes as follows: the combined Industrial IoT and its control method of the present disclosure build the IoT based on a five-platform structure, and the sensor network platform adopts a rear-sub-platform arrangement, so that the main platform of the sensor network platform can uniformly send and receive production line data, which can simplify the complex network design structure between the main platform of the sensor network platform and the sensor network platform, and realize centralized data processing or sending and receiving the data. Then, a plurality of sub-platforms of the sensor network platform are used for the data transmission and the data processing corresponding to different production lines, so as to ensure the validity and independence of the data, reduce mutual influence of the data of different production lines. The management platform adopts an independent arrangement, which can not only realize the processing and control of the data of different production lines corresponding to the plurality of sub-platforms of the sensor network platform, reduce mutual influence of the data of different production lines, but also reduce the data processing pressure of each management platform, thereby reducing the overall architecture cost of the IoT. Finally, the present disclosure also utilizes a centralized service platform for unified regulation, so that the service platform can better manage and control the IoT.

In the process of use, combined with the combined Industrial IoT and its control method, the data collection is performed on each production line equipment of different production line equipment, which realizes the rapid data collection. The data processing and the data transmission are performed by different platforms, which can also ensure the security and independence of the data. The data is processed to obtain the production line balance rate of each production line through the operation of the management platform, which reduces the difficulty and error of manual calculation, reduces labor costs, thereby realizing rapidly obtaining the production line balance rate, and reducing the impact on the manufacturing operations of the production line equipment. In addition, if necessary, the data package of manufacturing parameters corresponding to one of the production lines that meet the requirements of the production line balance rate is used as the data package of manufacturing parameters of other production lines and is directly sent to other production lines, so as to control the intelligent manufacturing of production line equipment in other production lines, thereby achieving rapid adjustment of the production line balance rate of all production lines. The adjustment does not require verification, which is safe, efficient, and low-cost.

BRIEF DESCRIPTION OF THE DRAWINGS

The present disclosure will be further described in the form of exemplary embodiments, and these exemplary embodiments will be described in detail with the drawings. These embodiments are not restrictive. In these embodiments, the same number represents the same structure, wherein.

DETAILED DESCRIPTION

Figure 1:
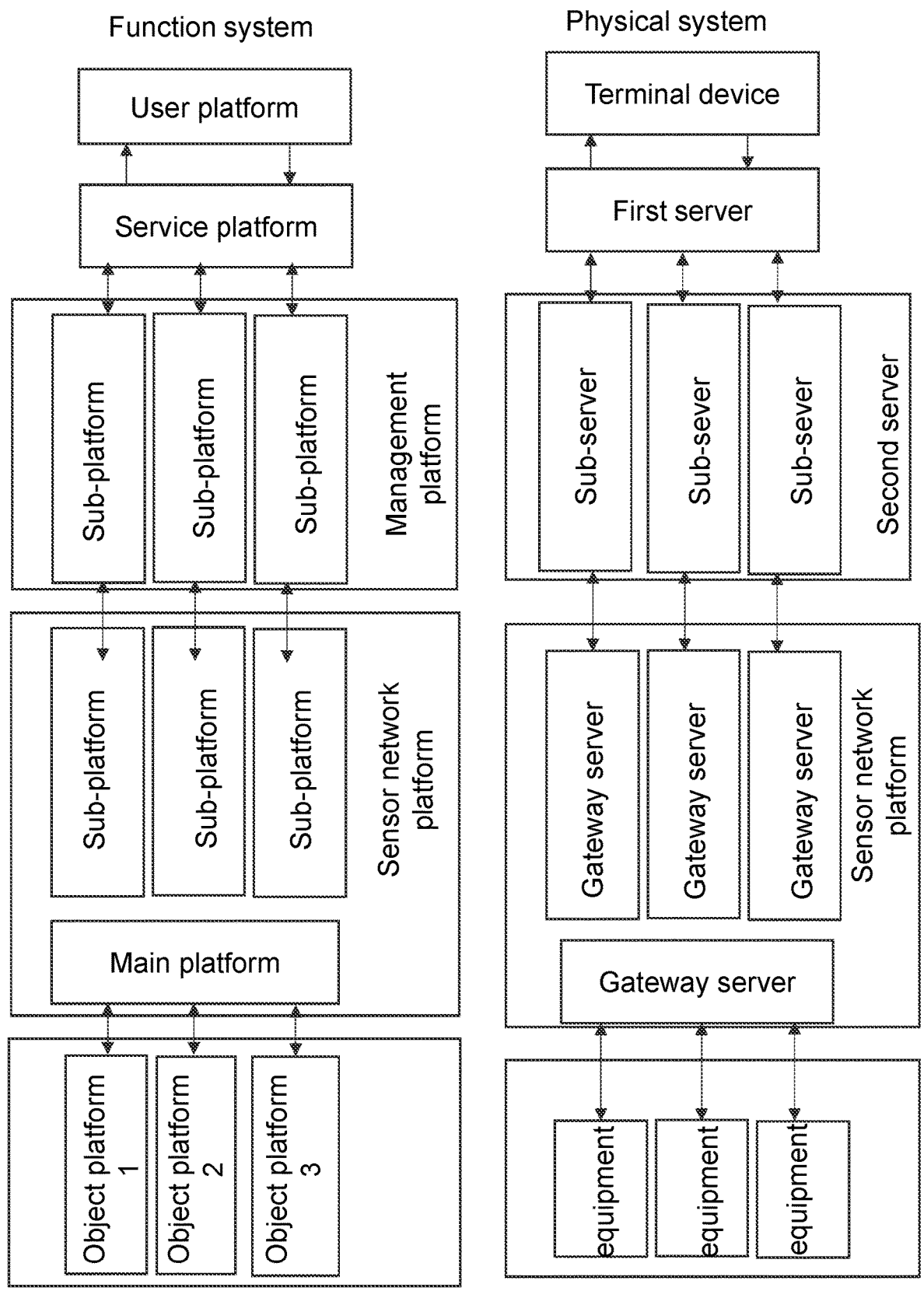
FIG. 1 illustrates a structural frame diagram of an Industrial Internet of Things (IoT) for controlling a production line balance rate according to some embodiments of the present disclosure.

In order to more clearly illustrate the technical solutions of the embodiments of the present disclosure, the following will briefly introduce the drawings that need to be used in the description of the embodiments. Obviously, the drawings in the following description are only some examples or embodiments of the disclosure. For those of ordinary skill in the art, without creative work, the disclosure can be applied to the application other similar scenarios according to these drawings. Unless it is obvious from the language environment or otherwise stated, the same reference numbers in the drawings represent the same structure or operation.

It should be understood that the "system", "device", "unit" and/or "module" used herein is a method for distinguishing different components, elements, parts, parts, or assemblies of different levels. However, if other words can achieve the same purpose, the words can be replaced by other expressions.

As shown in the present disclosure and the claims, unless the context clearly suggests exceptional circumstances, the words "a", "an", and/or "the" do not specifically refer to the singular, but also may include the plural, and the plural forms may be intended to include the singular forms as well, unless the context clearly indicates otherwise. Generally speaking, the terms "including" and "contain" only suggest that the operations and elements that have been clearly identified are included, and these operations and elements do not constitute an exclusive list, and the method or device may also include other operations or elements.

Flowcharts are used in the present disclosure to illustrate the operations performed by the system according to the embodiments of the present disclosure. It should be understood that the preceding or following operations are not necessarily performed precisely in order. Instead, the individual operations may be processed in reverse order or simultaneously. At the same time, users can also add other operations to these processes, or remove an operation or several operations from these processes.

FIG. 1 illustrates a structural frame diagram of an Industrial Internet of Things (IoT) for controlling a production line balance rate according to some embodiments of the present disclosure.

As shown in FIG. 1, some embodiments of the present disclosure provide an Industrial IoT for controlling a production line balance rate. The Industrial IoT may include a user platform, a service platform, a management platform, a sensor network platform, and an object platform interacting in sequence.

The service platform adopts a centralized arrangement, the management platform adopts an independent arrangement, the sensor network platform adopts a rear sub-platform arrangement, the independent arrangement is that the management platform uses different platforms for data storage, data processing, or data transmission for data of different object platforms, the rear sub-platform arrangement is provided with a main platform and a plurality of sub-platforms for the sensor network platform, and the plurality of sub-platforms respectively store and process data of different types or different receiving objects sent by the management platform, and the main platform stores and processes the data of the plurality of sub-platforms after summarizing and transmits the data to the object platform, and the centralized arrangement is that the service platform uniformly receives data, uniformly processes data, and uniformly sends data.

The object platform is configured with a number of parallel production lines with a same configuration, each production line includes a number of continuous production line equipment, and each production line equipment is equipped with a data collector.

When the number of the production lines perform manufacturing, each data collector simultaneously collects working hour data of a corresponding production line equipment and sends the working hour data to the main platform of the sensor network platform.

After receiving the working hour data, the main platform of the sensor network platform is configured to sort the working hour data of same production lines in sequence according to process positions of the production lines, pack the working hour data as a packaged file and send the packaged file to corresponding sub-platforms of the sensor network platform.

After receiving the packaged file, the plurality of sub-platforms of the sensor network platform are configured to generate a data file recognized from the packaged file by the management platform, and send the data file to a corresponding management platform.

After receiving the data file, the management platform is configured to obtain a production line balance rate of a corresponding production line according to a calculation rule, add the obtained production line balance rate to an index information for performing the data processing, and send the processed data to the service platform.

After receiving all data of the management platform, the service platform is configured to sort and store different production line balance rates according to the index information of different data and send them to the user platform.

As an existing IoT architecture, the user platform is configured to be a terminal device interacting with the user. The service platform is configured to be a first server for receiving instructions of the user platform and transmitting the instructions to the management platform, extracting information that is required to process the user platform from the management platform, and transmitting the extracted information to the user platform. The management platform is configured to be a second server for controlling the object platform to run and receiving feedback data of the object platform. The sensor network platform is configured to be a communication network and a gateway used to interact the object platform with the management platform. The object platform is configured to the production line for performing manufacturing and its production line equipment, and the data collector.

In the prior art, when the production line balance rate of a certain production line needs to be obtained, it is necessary to manually collect the single-piece manufacturing working hours of each production line equipment and record the corresponding production line equipment, which is a heavy workload, time-consuming, and a large amount of data, making it is prone to errors during data collection and data recording. In addition, when the production line balance rate is subsequently calculated, similar problems will occur in data import, data export, and classification. As a result, in the prior art, the calculation cycle of the production line balance rate is long and the accuracy is poor. When the production line equipment needs to change the production line balance rate according to the manufacturing requirements for corresponding manufacturing, it is often impossible to achieve it immediately, resulting in the production lines in the prior art often encountering many problems such as increased manufacturing costs, overcapacity or heavy equipment load, and increased costs and problems of the company's manufacturing.

The Industrial IoT and method for controlling a production line balance rate of the present disclosure build the IoT based on a five-platform structure, and the sensor network platform adopts a rear-sub-platform arrangement, so that the main platform of the sensor network platform can uniformly send and receive production line data, which can simplify the complex network design structure between the main platform of the sensor network platform and the sensor network platform, and realize centralized data processing or sending and receiving. Then a plurality of sub-platforms of the sensor network platform are used for the data transmission and the data processing corresponding to different production lines, so as to ensure the validity and independence of the data, reduce the mutual influence of the data of different production lines. The management platform adopts an independent arrangement, which can not only realize the processing and control of the data of different production lines corresponding to the plurality of sub-platforms of the sensor network platform, reduce much influence of the data of different production lines, but also reduce the data processing pressure of each management platform, thereby reducing the overall architecture cost of the Internet of Things. Finally, the present disclosure also utilizes the centralized service platform for unified regulation, so that the service platform can better manage and control the IoT.

When the present disclosure is in the process of use, combined with the Industrial IoT and method for controlling a production line balance rate, a corresponding data collection is performed on each production line equipment of different production line equipment, which can realize the rapid data collection. The data processing and the data transmission are performed by different platforms, which can also ensure the security and independence of the data. Through the operation of the management platform, the data is processed to obtain the production line balance rate of each production line, which reduces the difficulty and error of manual calculation, and reduces labor costs, thereby realizing the rapid obtaining of the production line balance rate, and reducing the impact on the manufacturing operations of the production line equipment.

It should be noted that the user platform in the embodiments may be a desktop computer, a tablet computer, a notebook computer, a mobile phone, or other electronic devices capable of data processing and data communication, which is not limited here. In specific applications, the first server and the second server may be a single server or a server cluster, which is not limited here. It should be understood that a process of the data processing mentioned in the embodiments may be processed by the processor of the server, and the data stored in the server may be stored in the storage device of the server, such as a hard disk or other memories. In specific applications, the sensor network platform may use multiple groups of gateway servers or multiple groups of intelligent routers, which are not limited here. It should be understood that the process of the data processing mentioned in the embodiments of the present disclosure may be processed by the processor of the gateway server, and the data stored in the gateway server may be stored in the storage device of the gateway server, such as a hard disk, a solid state drive (SSD), or other memories.

In some embodiments, parallel production lines refer to production lines for performing the same manufacturing task, which are formed with the same configuration structure according to the same process, equipment, location, etc. If the downstream of a main production line is divided into several sub-production lines, and the several sub-production lines perform the same tasks according to the same configuration, the several sub-production lines are parallel production lines. Production line equipment is all kinds of production line equipment relying on the product manufacturing line. Taking mechanical products as an example, production line equipment may be various types of intelligent machining equipment such as intelligent lathes, intelligent milling machines, intelligent planers, etc., and the production line equipment may be also various types of modification equipment, such as intelligent tempering equipment, intelligent quenching equipment, intelligent coating equipment, etc. Correspondingly, the manufacturing parameters are the parameters set by the production line equipment for manufacturing, such as the turning tool path parameters of the lathe, the tempering temperature of the tempering equipment, the coating amount of the coating equipment, etc.

Correspondingly, the finished product parameters are the parameter values of the finished product made by the production line equipment according to the manufacturing parameters under the influence of the manufacturing parameters, such as size parameters of the finished product formed by the lathe under the control of the turning tool path parameters, toughness value of the finished product formed by tempering equipment under the control of the tempering temperature, the thickness of the finished coating film formed by the coating equipment under the control of the coating amount, etc. Further, the data collector is used to collect the working hour data of the corresponding production line equipment, which may be a device used for timing or counting, such as an electronic stopwatch, a counter, a counting sensor, etc.

In the prior art, when the production line production line balance rate needs to be replaced according to the manufacturing requirements, it often requires a long calculation time and verification time. In addition, the manufacturing parameters of the production line equipment in each production line may be repeatedly adjusted, which is time-consuming and labor-intensive, so that execution and replacement of the production line balance rates cannot be achieved immediately.

Based on the above problems, the present disclosure can also realize rapid replacement of the production line balance rate.

After receiving all the production line balance rates and selecting a certain production line balance rate as a target production line balance rate according to production needs, the user platform sends a first instruction to the service platform.

After receiving the first instruction, the service platform sends a second instruction to the corresponding management platform according to index information of the target production line balance rate.

After receiving the second instruction, the corresponding management platform retrieves a data package of manufacturing parameters pre-stored in the management platform, and sends the data package of manufacturing parameters to the corresponding sub-platforms of the sensor network platform, the data package of manufacturing parameters includes a plurality of manufacturing parameters in the production line sorted in sequence according to process position of the production line, and the plurality of manufacturing parameters sequentially correspond to the production line equipment of the process position the production line.

After receiving the data package of manufacturing parameters, the sub-platforms of the sensor network platform perform the data processing and send the processed data package of manufacturing parameters to the main platform of the sensor network platform.

After receiving the data package of manufacturing parameters, the main platform of the sensor network platform forms a first configuration file recognized by the production line equipment and sends the first configuration file to production lines except the production line where the target production line balance rate is located.

After receiving the first configuration file, the production line equipment of the production line is configured to perform manufacturing according to the corresponding manufacturing parameters in the first configuration file.

Through the above methods, if necessary, the Industrial IoT for controlling a production line balance rate can use the data package of manufacturing parameters corresponding to a production line that meets the production line balance rate requirements or is within the error range as the data package of manufacturing parameters of other production lines, the Industrial IoT can directly send the data package of manufacturing parameters to other production lines to control the intelligent manufacturing of production line equipment in other production lines, so as to achieve rapid adjustment of the production line balance rate of all production lines. The adjustment does not require verification, which is safe, high efficiency, and low cost.

After adjusting the production line balance rate of the corresponding production line, considering the stability of the data and subsequent requirements, the main platform of the sensor network platform of the present disclosure is also implemented to realize data classification and storage.

After receiving the data package of manufacturing parameters, the main platform of the sensor network platform is configured to simultaneously send the data package of manufacturing parameters to sub-platforms except the sub-platform of the sensor network where the target production line balance rate is located.

After receiving the data package of manufacturing parameters, the sub-platforms of the sensor network platform are further configured to process the data package of manufacturing parameters and send the processed data to the corresponding management platform.

After receiving the data package of manufacturing parameters, the management platform is further configured to store the data package of manufacturing parameters as a temporary data package.

When the production line equipment needs to restore the original production line balance rate after completing the corresponding manufacturing requirements, the Industrial IoT for controlling the production line balance rate also includes following operations.

After performing manufacturing by the production line equipment of the production line according to the corresponding manufacturing parameters in the first configuration file and receiving a data rollback instruction sent by the user platform, the service platform is configured to perform the data processing on the data rollback instruction and send it to remaining management platforms except the management platform where the target production line balance rate is located.

After receiving the data rollback instruction, the management platform is further configured to perform the data processing on the data rollback instruction, delete an temporary data package corresponding to the management platform, and use a pre-stored data package of manufacturing parameters in the corresponding management platform as the rollback data to perform a rollback operation, and then send the pre-stored data package of manufacturing parameters to the sub-platform corresponding to the sensor network after completing the rollback operation.

After receiving the pre-stored data package of manufacturing parameters, the sub-platforms of the sensor network platform are further configured to send it to the main platform of the sensor network platform after performing the data processing.

After receiving the data package of manufacturing parameters, the main platform of the sensor network platform is further configured to form a second configuration file recognized by the production line equipment and send it to remaining production lines except the production line where the target production line balance rate is located.

The production line equipment is further configured to receive the second configuration file and perform manufacturing according to the corresponding manufacturing parameters in the second configuration file.

Through the above methods, all the production lines may execute the data rollback instruction when needed, so as to restore the production line balance rate in the state of the pre-stored data package of manufacturing parameters, and realize the rapid manufacturing, adjustment, and recovery of the production line.

In some embodiments, each data collector may simultaneously collect the working hour data of the corresponding production line equipment. Specifically, the data collector may collect working hours required by the production line equipment to complete the manufacture of a single product, collection times may be greater than or equal to ten times, and all the collected working hours are uniformly packaged according to the corresponding production line equipment as working hour data. For example, in a production line, the working hour data of the first production line equipment is collected, the first production line equipment is named as 0101, similarly, the subsequent production line equipment are sequentially named as 0102, 0103 . . . 01N, and the $N^{th}$ production line equipment of the $N^{th}$ production line is named as NN. When the collection times for collecting 0101 is 10, and the data collected each time is set to be 70.2, 71, 69.5, 69.7, 72.8, 69, 70.7, 71.3, 71.1, 70.4, then 70.2, 71.1, 70.4 71, 69.5, 69.7, 72.8, 69, 70.7, 71.3, 71.1, 70.4 are uniformly packaged as working hour data of the corresponding production line equipment 0101.

In some embodiments, after receiving the data file, the management platform may obtain the production line balance rate of the corresponding production line according to an operation rule, which includes following operations.

After receiving the data file, the management platform extracts a sum of the production line equipment in the production line as a total count of workstations and divides the production line equipment into multiple workstations according to the process position of the production line to form a workstation table.

The management platform extracts each working hour data of the production line equipment in the data file and fills each working hour data into the workstation table in sequence according to the corresponding workstation.

The management platform generates a stack diagram by taking a count of workstations in the workstation table as a horizontal coordinate, and a sum of the working hour data corresponding to the workstations as a vertical coordinate and obtains the vertical coordinate data with the highest column in the stack diagram as the bottleneck workstation time.

The management platform obtains the sum of the working hours of each workstation of the production line by adding the working hour data of all workstations.

The management platform calculates the production line balance rate according to the following formula:

$$LB=T0/(T1 \times S) \times 100\% \quad (1)$$

where LB is the production line balance rate, TO is the sum of the working hours of each workstation, T1 is the bottleneck workstation time, and S is the total count of workstations.

In specific applications, for example, taking the production line where the above-mentioned production line equipment 0101 is located as the object, the workstation table is formed by the object shown in Table 1 below:

TABLE 1

| Workstation table | | | | |
|---|---|---|---|---|
| 0101 workstation | 0102 workstation | 0103 workstation | . . . | 010N workstation |

Referring to Table 1, the total count of workstations in the production line may be obtained as 1+2+3+4+ . . . +N.

Table 2 is obtained by filling the collected working hour data into the above workstation table in sequence (only the working hour data of the above production line equipment 0101 is filled into the table as an example, and the working hour data of other production line equipment are omitted).

TABLE 2

Workstation 0101 table filled with working hour data

| 0101 workstation | 0102 workstation | 0103 workstation | ... | 010N workstation |
|---|---|---|---|---|
| 70.2 | | | | |
| 71 | | | | |
| 69.5 | | | | |
| 69.7 | | | | |
| 72.8 | | | | |
| 69 | | | | |
| 70.7 | | | | |
| 71.3 | | | | |
| 71.1 | | | | |
| 70.4 | | | | |

Figure 2:
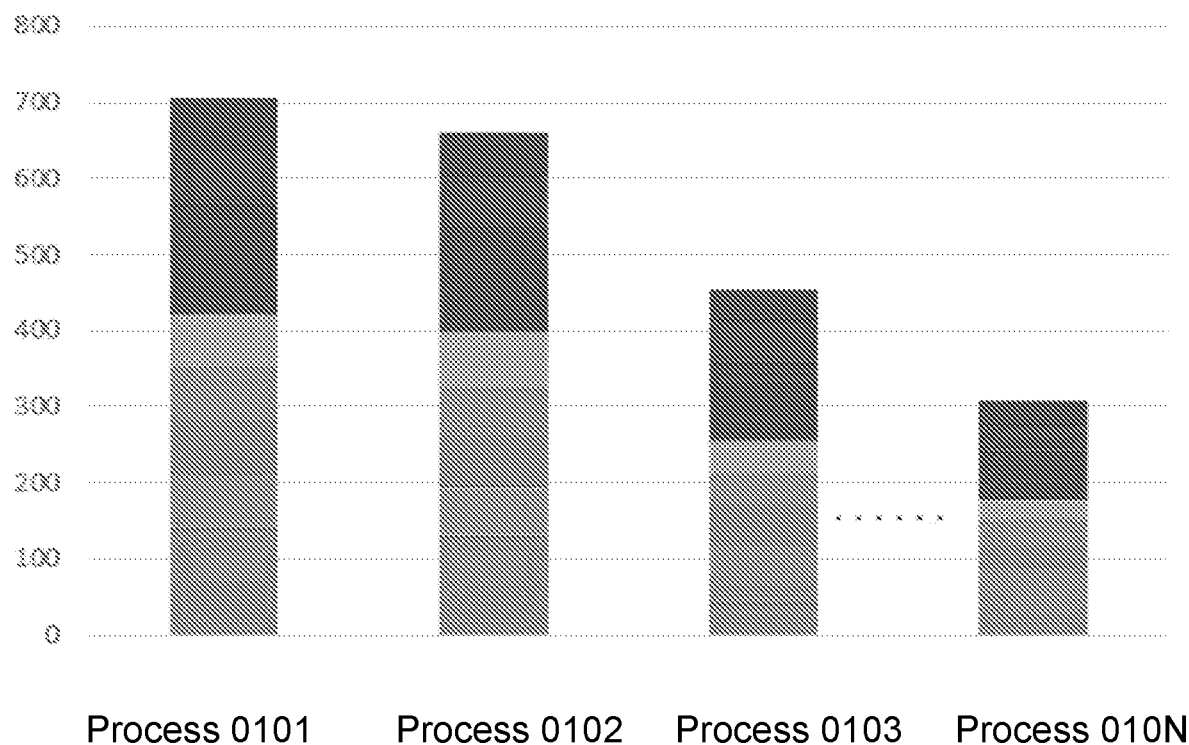
FIG. 2 illustrates a schematic diagram of a stack diagram according to some embodiments of the present disclosure.

According to Table 2, a stack diagram is formed as shown in FIG. 2 using the function of the stack diagram in excel. As shown in FIG. 2, the working hour data of the 0101 workstation is only brought into the figure, and the columnar structures of other workstations are only added to illustrate the forming principle of the stack diagram. It should be noted that the formation of the stack diagram may be performed manually or automatically through computer functions. The programs involved in realizing this function through computer functions belong to the prior art or the programs can be realized by those skilled in the art without labor achievements. Therefore, the present disclosure will not be further described.

It can be seen from FIG. 2 that the column of the 0101 workstation is the highest, vertical coordinate data of which is used as the bottleneck workstation time. The bottleneck workstation time is the sum of 70.2, 71, 69.5, 69.7, 72.8, 69, 70.7, 71.3, 71.1, and 70.4. Finally, the sum of the working hours of each workstation is obtained by adding all the working hour data from workstation 0101 to 010N, the production line balance rate of the production line 01 is obtained using the formula (1), and the production line balance rate of each production line is obtained according to the above method.

Figure 4:
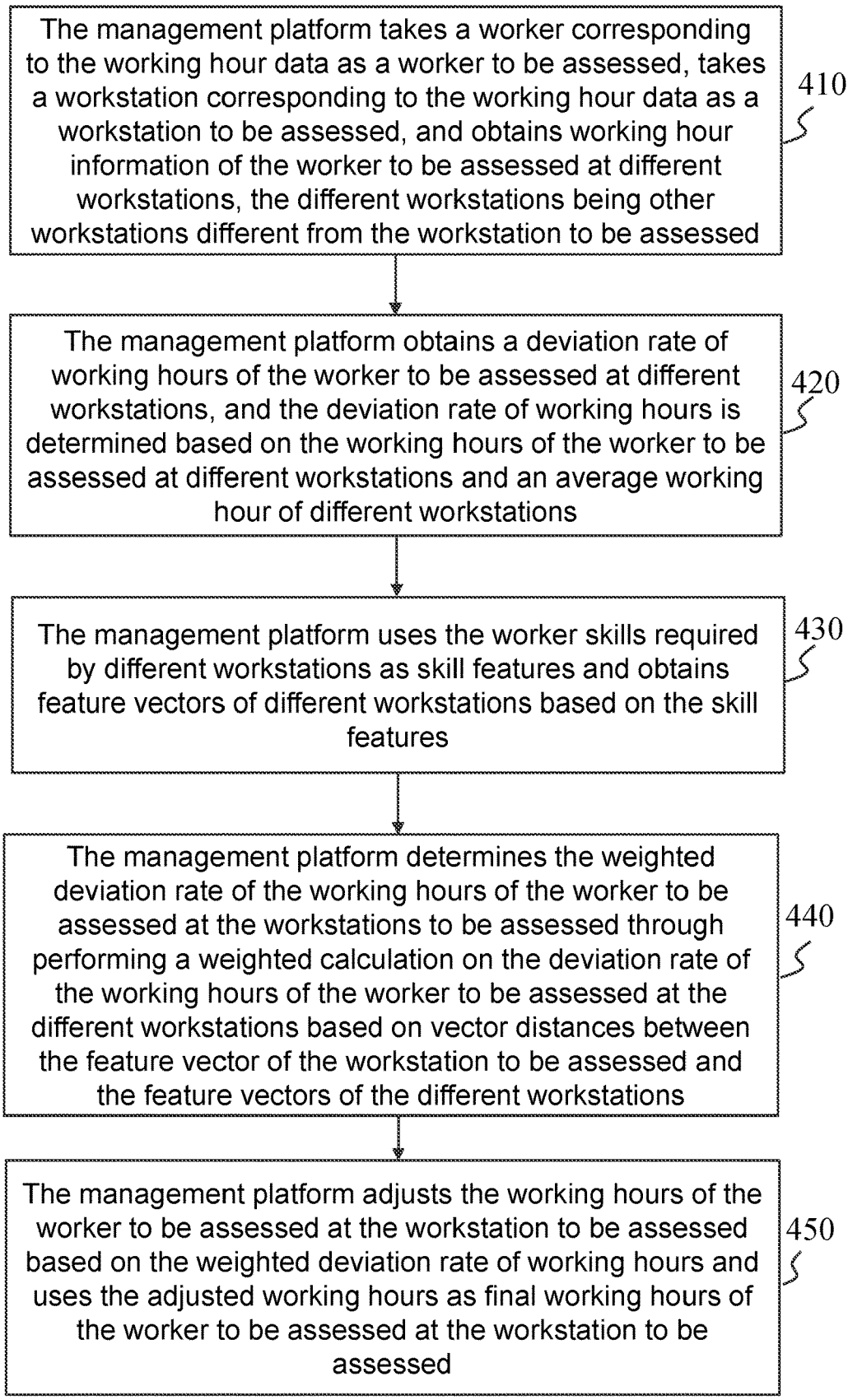
FIG. 4 illustrates a flowchart for obtaining working hour data of the workstation according to some embodiments of the present disclosure.

FIG. 4 illustrates a flowchart for obtaining working hour data of the workstation according to some embodiments of the present disclosure. In some embodiments, a process 400 may be performed by a management platform. As shown in FIG. 4, the process 400 includes the following operations.

In operation 410, the management platform may take a worker corresponding to the working hour data as a worker to be assessed, take a workstation corresponding to the working hour data as a workstation to be assessed, and obtain working hour information of the worker to be assessed at different workstations, the different workstations being other workstations different from the workstation to be assessed.

The worker to be assessed refers to the worker corresponding to the obtained working hour data. For example, if the obtained working hour data is the working hour data generated by a worker A at a workstation K, the worker A is the worker to be assessed.

The workstation to be assessed refers to the workstation where the obtained working hour data is generated. For example, if the obtained working hour data is the working hour data is generated by the worker A at the workstation K, the workstation K is the workstation to be assessed.

Different workstation refers to at least one other workstation different from the workstation to be assessed. For example, the workstations of a production line include a workstation H, a workstation J, a workstation K, a workstation L, and the workstation to be assessed is workstation J, the different workstations are the workstation H, the workstation K, and the workstation L.

The working hour information of the worker to be assessed at different workstations may include the working hours required for the worker to be assessed to complete corresponding work tasks at different workstations. For example, the working hours of the worker A at the workstation J are 6.7 hours, the working hours at the workstation K are 1.2 hours. It should be noted that the unit of the working hours may also be other time units, such as minutes, seconds, or days, etc.

In some embodiments, the working hour information of the worker to be assessed at different workstations may be obtained in various ways. For example, the working hour information may be collected based on one or more data collectors (e.g., an electronic stopwatch, a counter, and a counting sensor) arranged on different production line equipment. For example, the data collector J may time the working hours of the worker A at the workstation J to obtain the working hour information of the worker A at the workstation J (e.g., 0.5 hours, 3 hours, etc.). More descriptions regarding the data collector may be found elsewhere in the present disclosure, e.g., FIG. 1 and its descriptions thereof.

In operation 420, the management platform may obtain a deviation rate of working hours of the worker to be assessed at different workstations, and the deviation rate of working hours is determined based on the working hours of the worker to be assessed at different workstations and an average working hour of different workstations.

The deviation rate of working hours refers to a degree of deviation between the working hours required by the worker to be assessed at the corresponding workstation and the average working hour of the workstation. For example, the deviation rate of working hours may be 0, positive, or negative, 0 means no deviation, positive means a positive deviation, and negative means a negative deviation. No deviation indicates that the working hours of the worker to be assessed at the workstation are consistent with the average working hour of the workstation, the positive deviation indicates that the working hours of the worker to be assessed at the workstation are more than the average working hour of the workstation, and the negative deviation indicates that the working hours of the worker to be assessed are less than the average work hour of the workstation.

In some embodiments, the deviation rate of the working hours may be determined based on the working hours of the worker to be assessed at a certain workstation and the average working hour of the workstation. For example, the average working hour of the workstation J is 5 hours, and the working hours of the worker A at the workstation J is 5.5 hours, then the deviation rate of the working hours Pj of the worker A at the workstation J is (5.5-5)/5=0.1, which means that the working hours required by the worker A at the workstation J are 10% more than the average working hour of the workstation J.

In some embodiments, the average working hour of a workstation may be obtained based on the historical working hours (e.g., a past year, a past week) corresponding to several workers who have worked at the workstation. For example, in the past week, at the workstation K, the working hours of the worker B are 6 hours, the working hours of the worker C are 8 hours, and the working hours of the worker D are 7 hours, then the average working hour of the workstation K is (6+8+7)/3=7 hours.

In operation 430, the management platform may use the worker skills required by different workstations as skill features and obtain feature vectors of different workstations based on the skill features.

The worker skills refer to the skills that workers may use for productive work. such as cleaning, cooling, packaging, machine tool operation, etc. In some embodiments, the management platform may use the worker skills required for each workstation as skill features of the workstation. For example, the worker skills required by the workstation K include cleaning and cooling, and the skill features corresponding to the workstation K are cleaning and cooling.

In some embodiments, the management platform may determine the feature vector of each workstation based on the skill features of each workstation. As an example only, the management platform may convert the skill features of each workstation into corresponding feature vectors based on preset rules. For example, the feature vectors corresponding to skill features cleaning, cooling, machine tool control, packaging, and temperature measurement are 1, 2, 3, 4, and 5, respectively, the skill features corresponding to the workstation H include cleaning, cooling, and machine tool control, the skill features corresponding to the workstation J include machine tool control and packaging, the skill features corresponding to the workstation K include machine tool control, packaging, and temperature measurement, so the feature vector Vh={1, 2, 3} corresponding to the workstation H, the feature vector Vj={3, 4} corresponding to the workstation J, and the feature vector Vk={3, 4, 5} corresponding to the workstation K.

In operation 440, the management platform may determine the weighted deviation rate of the working hours of the worker to be assessed at the workstations to be assessed through performing a weighted calculation on the deviation rate of the working hours of the worker to be assessed at the different workstations based on vector distances between the feature vector of the workstation to be assessed and the feature vectors of the different workstations.

The vector distance refers to a distance between the feature vector corresponding to the workstation to be assessed and the feature vector corresponding to other workstations. The vector distance can reflect a degree of difference in skill features between different workstations. For example, the larger the vector distance is between the two workstations, the greater the difference in the skill features corresponding to the two workstations is. In some embodiments, the vector distance may be a cosine distance, and a Euclidean distance, etc.

In some embodiments, the weighted calculation may be a weighted calculation of the deviation rate of the working hours of the workers to be assessed at different workstations. The weight of the weighted calculation may be determined based on various methods. For example, the weight corresponding to each workstation may be pre-set manually. For another example, the weight may be related to the vector distance between the feature vectors of other workstations and the feature vector of the workstation to be assessed.

As an example only, it is assumed that the workstation to be assessed is the workstation H, other workstations are the workstations J and K, Vh represents the feature vector corresponding to the workstation H, Vj represents the feature vector corresponding to the workstation J, and Vk represents the feature vector corresponding to the workstation K. The vector distance between Vh and Vj is Dj, and the vector distance between Vh and Vk is Dk, then the weighted deviation rate of the worker to be assessed at the workstation H may be:

$$\text{weighted deviation rate} = (Pj^* \exp(-Dj) + Pk^* \exp(-Dk))/\text{sigma}(\exp(\cdot)) \quad (2)$$

where sigma represents the summation, exp( ) represents an exponential function of the vector distance, exp(−Dj) represents an exponential function of the vector distance of the feature vector of the workstation H to be assessed and the feature vector of the workstation J, exp(−Dk) represents an exponential function of the vector distance between the feature vector of the workstation H to be assessed and feature vector of the workstation K, Pj represents a deviation rate of the working hours of the worker to be assessed at the workstation J, and Pk represents the deviation rate of the working hours of the worker to be assessed at the workstation K.

In some embodiments, the management platform may further determine the weighted deviation rate of working hours of the worker to be assessed at the workstation to be assessed through the model. More descriptions regarding determining the weighted deviation rate of working hours through the model may be found elsewhere in the present disclosure, e.g., FIG. 5 and its relevant descriptions thereof.

In operation 450, the management platform may adjust the working hours of the worker to be assessed at the workstation to be assessed based on the weighted deviation rate of working hours and use the adjusted working hours as final working hours of the worker to be assessed at the workstation to be assessed.

The final working hours refer to data information of the working hours data of the workstation to be assessed that is finally used to fill in the workstation table.

In some embodiments, the management platform may adjust the working hours of the worker to be assessed at the workstation to be assessed based on the weighted deviation rate of working hours and use the adjusted working hours as the final working hours.

For example, the working hours of the worker A to be assessed at the workstation H to be assessed are 3 hours, the weighted deviation rate of the worker A to be assessed at the workstation H to be assessed is +0.5 according to the above method, indicating that the worker A to be assessed will spend 50% more time than others to complete the task at the workstation H to be assessed, so the adjustment parameter is 1+0.5=1.5, then the final working hours of the worker A to be assessed at the workstation H to be assessed is obtained as 2 hours through dividing the working hours of 3 hours by 1.5.

For another example, the working hours of the worker B to be assessed at the workstation J to be assessed is 4.5 hours, the weighted deviation rate of the worker B to be assessed at the workstation J to be assessed is −0.1 according to the above method, indicating that the worker B to be assessed will spend 10% less time than others, so the adjustment parameter is 1-0.1=0.9, then the final working hours of the worker B to be assessed at the workstation J to be assessed is obtained as 5 hours through dividing the working hours of 4.5 hours by 0.9.

The methods described in some embodiments of the present disclosure take into account the deviating influence of different worker conditions on the working hour data, and the deviating influence of different workers adaptation to different workstations on the working hour data, and add the calculation of the deviation rate, causing that the obtained working hour data is more in line with the actual situation of the workstation to be assessed.

Figure 5:
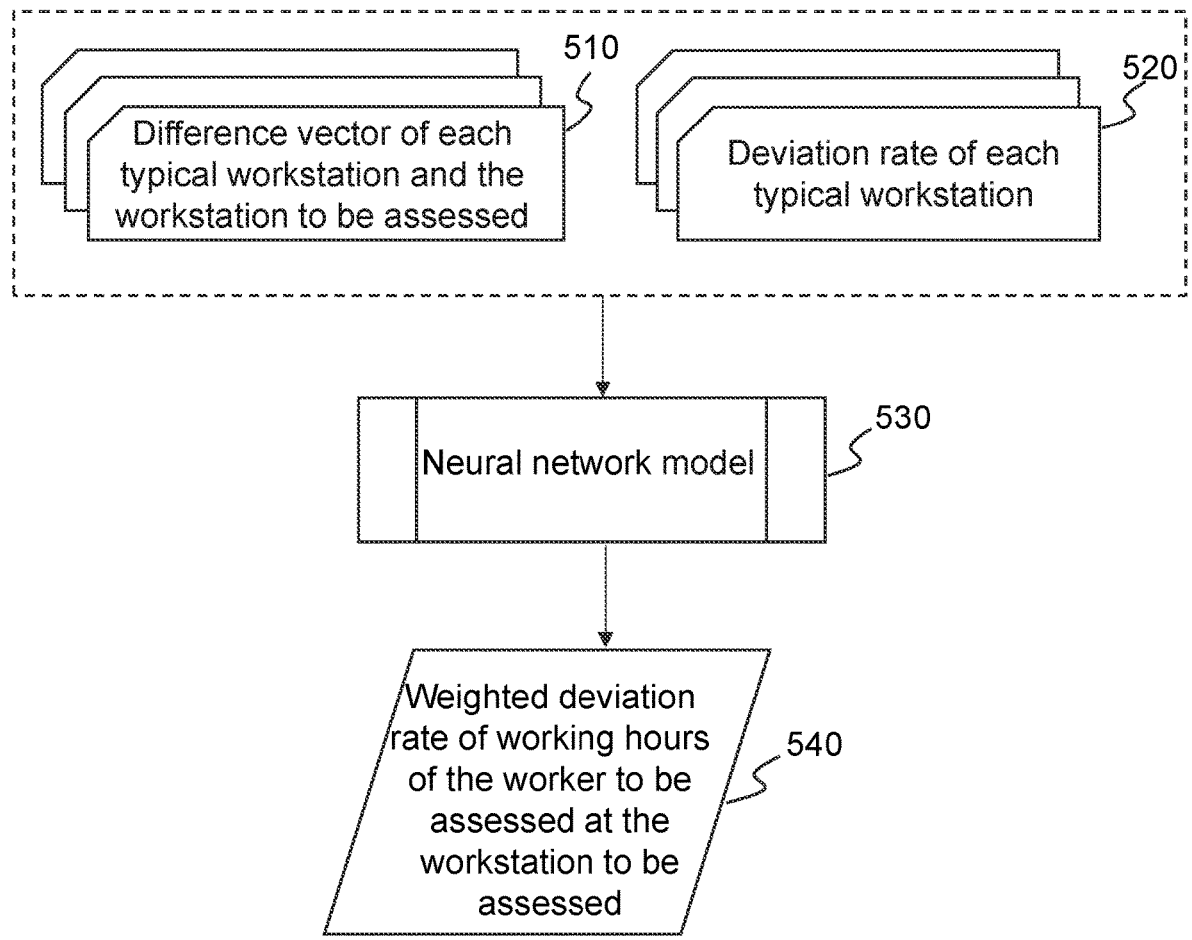
FIG. 5 illustrates a schematic diagram for determining a weighted deviation rate of working hours of the workstation to be assessed according to some embodiments of the present disclosure.

In some embodiments, the weighted deviation rate of the working hours of the worker to be assessed at the workstation to be assessed may be calculated based on a neural network model 530 shown in FIG. 5.

In some embodiments, the neural network model 530 may determine the weighted deviation rate of the working hours of the worker to be assessed at the workstation to be assessed based on the processing of the difference vector between each typical workstation and the workstation to be assessed, and the deviation rate of each typical workstation. In some embodiments, the types of neural network models 530 may be various. For example, the neural network model 530 type may be a CNN model, and a DNN model, or the like. For another example, the first model may also be a deep learning model such as a Recurrent Neural Network (RNN), a Deep Belief Network (DBN), or the like, or any combination thereof.

In some embodiments, the input features of the neural network model 530 may include the difference vector 510 of each typical workstation and the workstation to be assessed, and the deviation rate 520 of each typical workstation, and the output of the neural network model 530 is the weighted deviation rate of working hours 540 of the worker to be assessed at the workstation to be assessed.

In some embodiments, a typical workstation refers to a workstation with sufficient working hours data.

The difference vector 510 of each typical workstation and the workstation to be assessed refers to the difference between the feature vector of each typical workstation and the feature vector of the workstation to be assessed, and the difference vector 510 of each typical workstation and the workstation to be assessed may be represented based on the vector distance between the feature vector of each typical workstation and the feature vector of the workstation to be assessed. More descriptions regarding the feature vector of the workstations and the vector distance of the feature vector between the workstations may be found elsewhere in the present disclosure, e.g., FIG. 4 and its relevant descriptions thereof.

As an example only, it is assumed that the workstation to be assessed is H, the other typical workstations are J and K, the difference vector between the typical workstation J and the workstation to be assessed H is D'j, the difference vector between the typical workstation K and the workstation to be assessed H is D'k, the deviation rate of the working hours of the worker to be assessed at the typical work workstation J is Pj, and the deviation rate of the working hours of the worker to be assessed at the typical workstation K is Pk, then the input of the neural network model 530 is (D'j, Pj) and (D'k, Pk).

In some embodiments, the processing device may train an initial neural network model based on multiple sets of training data to obtain a neural network model. A set of training data samples includes the difference vector between each typical workstation and the typical workstation used as the workstation to be assessed, as well as the deviation rate of working hours of a worker at each typical workstation. The multiple sets of training data samples may correspond to the deviation rate data of working hours of the multiple workers at each typical workstation and the difference vector between the multiple typical workstations. The difference vector between the typical workstations as training samples may be calculated by the above-mentioned feature vector extraction method and the vector distance algorithm, the deviation rate of workers at each typical workstation as a training sample may be obtained by obtaining the working hours of workers at different typical workstations and the average working hour of the typical workstation and performing corresponding calculations. More descriptions regarding the specific calculation of the deviation rate may be found elsewhere in the present disclosure, e.g., FIG. 4 and its relevant descriptions thereof. The labels of each set of training data represent the weighted deviation rate of the working hours of the worker at the typical workstation used as the workstation to be assessed.

In some embodiments, the labels of training samples may be manual labeled. For example, the weighted deviation rate of the working hours of the workers at each typical workstation may be determined based on historical data, and the corresponding weighted deviation rate of the working hours is obtained as a label based on the typical workstation used as the workstation to be assessed and the worker information used as the worker to be assessed when the model is trained.

In some embodiments, a loss function may be constructed from the labels and the results of the initial neural network model, and parameters of the neural network model may be iteratively updated based on the loss function. When the loss function of the initial neural network model satisfies preset conditions, the model training is completed, and the trained neural network model is obtained. The preset conditions may be that the loss function converges, the count of iterations reaches a threshold, etc.

By means of some of the above-mentioned embodiments, compared with the manual method of determining the deviation rate of the working hour based on the weighted calculation formula of vector distance, the deviation rate of the working hours is determined based on the neural network model, which can better reflect the impact of different features of the workstations on different workers, thereby ensuring the validity of the working hours data determined based on the deviation rate of working hour.

In some embodiments, the index information at least includes any one or more index data of the management platform, the sub-platforms of the sensor network platform, or the production lines corresponding to the production line balance rate, and the index data may be a serial number, a sequence, or a corresponding name. For example, the index data may be the number "01" of the above-mentioned production line or the corresponding name "production line 01", etc.

Figure 3:
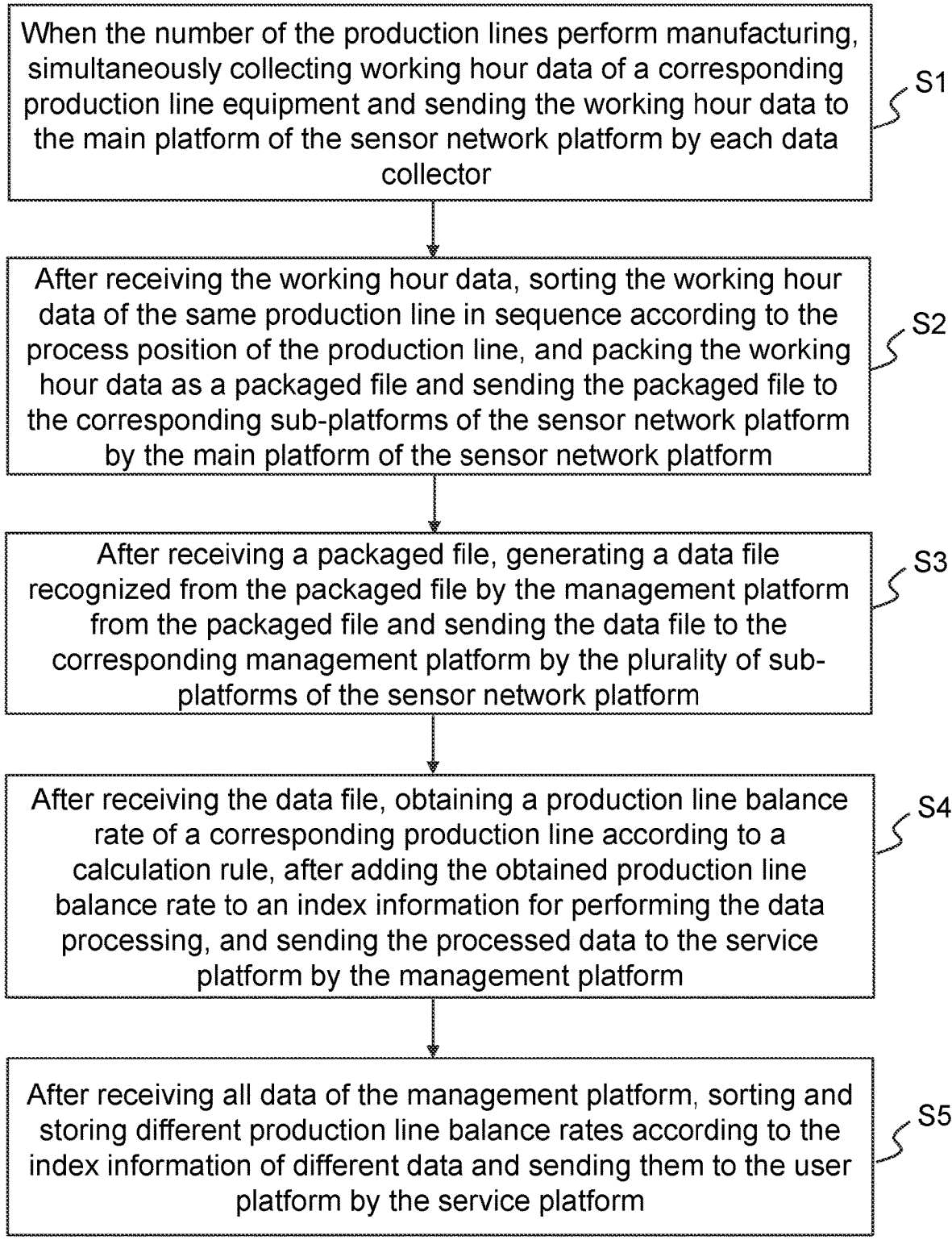
FIG. 3 illustrates a flowchart of a method of an Industrial Internet of Things (IoT) for controlling a production line balance rate according to some embodiments of the present disclosure.

As shown in FIG. 3, the present disclosure also provides a method of an Industrial IoT for controlling a production line balance rate based on the above Industrial IoT for controlling a production line balance rate, and the method includes following operations.

The object platform being configured with a number of parallel production lines with a same configuration, each production line includes a number of continuous production line equipment, and each production line equipment is equipped with a data collector.

When the number of the production lines perform manufacturing, simultaneously collecting working hour data of a corresponding production line equipment and sending the working hour data to the main platform of the sensor network platform by each data collector (S1).

After receiving the working hour data, sorting the working hour data of the same production line in sequence according to the process position of the production line, and packing the working hour data as a packaged file and sending the packaged file to the corresponding sub-platforms of the sensor network platform by the main platform of the sensor network platform (S2).

After receiving a packaged file, generating a data file recognized from the packaged file by the management platform from the packaged file and sending the data file to the corresponding management platform by the plurality of sub-platforms of the sensor network platform (S3).

After receiving the data file, obtaining a production line balance rate of a corresponding production line according to a calculation rule, after adding the obtained production line balance rate to an index information for performing the data processing, and sending the processed data to the service platform by the management platform (S4).

After receiving all data of the management platform, sorting and storing different production line balance rates according to the index information of different data and sending them to the user platform by the service platform (S5).

The Industrial IoT method for controlling the production line balance rate further includes following operations.

After receiving all the production line balance rates and selecting a certain production line balance rate as a target production line balance rate according to production needs, sending a first instruction to the service platform by the user platform.

After receiving the first instruction, sending a second instruction to the corresponding management platform according to index information of the target production line balance rate by the service platform.

after receiving the second instruction, retrieving a data package of manufacturing parameters pre-stored in the management platform and sending the data package of manufacturing parameters to the corresponding sub-platforms of the sensor network by the management platform, the data package of manufacturing parameters including the a plurality of manufacturing parameters in the production line sorted in sequence according to the process position of the production line, and the plurality of manufacturing parameters sequentially correspond to the production line equipment of the process position of production line.

after receiving the data package of manufacturing parameters, performing the data processing, and sending the processed data package of manufacturing parameters to the main platform of the sensor network platform by the plurality of sub-platforms of the sensor network platform.

After receiving the data package of manufacturing parameters, forming a first configuration file recognized by the production line equipment and sending the first configuration file to the production lines except the production line where the target production line balance rate is located by the main platform of the sensor network platform.

After receiving the first configuration file, performing manufacturing according to the corresponding manufacturing parameters in the first configuration file by the production line equipment of the production line.

Those of ordinary skill in the art can realize that the units and algorithm operations of each example described in conjunction with the embodiments disclosed herein can be implemented in electronic hardware, computer software, or a combination of the two, in order to clearly illustrate the differences between hardware and software Interchangeability, the above description has generally described the components and operations of each example in terms of function. Whether these functions are performed in hardware or software depends on the specific application and design constraints of the technical solution. Skilled artisans may implement the described functionality using different methods for each particular application, but such implementation should not be considered beyond the scope of the present disclosure.

In the several embodiments provided in the application, it should be understood that the disclosed apparatus and method may be implemented in other manners. For example, the apparatus embodiments described above are only illustrative. For example, the division of the units is only a logical function division. In actual implementation, there may be other division methods. For example, multiple units or components may be combined or may be integrated into another system, or some features may be omitted, or not implemented. In addition, the shown or discussed mutual coupling or direct coupling or communication connection may be indirect coupling or communication connection through some interfaces, devices or units, or may be electrical, mechanical or other forms of connection.

The unit described as a separate component may or may not be physically separated. As a unit, those of ordinary skill in the art can realize that the unit and algorithm operations of each example described in conjunction with the embodiments disclosed herein can be used. It is implemented by electronic hardware, computer software or a combination of the two. In order to clearly illustrate the interchangeability of hardware and software, the above description has generally described the components and operations of each example in terms of functions. Whether these functions are performed in hardware or software depends on the specific application and design constraints of the technical solution. Skilled artisans may implement the described functionality using different methods for each particular application, but such implementations should not be considered beyond the scope of the present disclosure.

In addition, each functional unit in each embodiment of the present disclosure may be integrated into one processing unit, or each unit may exist physically alone, or two or more units may be integrated into one unit. The above-mentioned integrated units may be implemented in the form of hardware or software functional units.

The integrated unit, if implemented in the form of a software functional unit and sold or used as an independent product, may be stored in a computer-readable storage medium. Based on the understanding, the technical solution of the present disclosure is essentially or a part that contributes to the prior art, or all or part of the technical solution may be embodied in the form of a software product, and the computer software product is stored in a storage medium, including several instructions for causing a computer device (which may be a personal computer, a server, or a grid device, etc.) to execute all or part of the operations of the methods described in the various embodiments of the present disclosure. The aforementioned storage medium includes: a USB flash disk, a mobile hard disk, Read-Only Memory (ROM), Random Access Memory (RAM), a magnetic disk, an optical disk, or other medias that can store program codes.

The specific embodiments described above further describe the objectives, technical solutions and beneficial effects of the present disclosure in detail. It should be understood that the above descriptions are only specific embodiments of the present disclosure, which are not intended to limit the scope of the present disclosure. The protection scope, any modification, equivalent replacement, improvement, etc. made within the spirit and principle of the present disclosure shall be included within the protection scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, which are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of the present disclosure are not necessarily all referring to the same embodiment. Furthermore, the particular features, structures or characteristics may be combined as suitable in one or more embodiments of the present disclosure.

Additionally, the order in which elements and sequences of the processes described herein are processed, the use of alphanumeric characters, or the use of other designations, is not intended to limit the order of the processes and methods described herein, unless explicitly claimed. While various presently contemplated embodiments of the invention have been discussed in the foregoing disclosure by way of example, it is to be understood that such detail is solely for that purpose and that the appended claims are not limited to the disclosed embodiments, but, on the contrary, are intended to cover all modifications and equivalent arrangements that are within the spirit and scope of the embodiments herein. For example, although the system components described above may be implemented by hardware devices, they may also be implemented by software-only solutions, such as installing the described system on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities or properties used to describe and claim certain embodiments of the present disclosure are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

For each patent, patent present disclosure, patent present disclosure publications and other materials referenced in the present disclosure, such as articles, books, instructions, publications, documents, etc., here, all of them will be incorporated herein by reference. Except for the present disclosure history documentation of the present disclosure or the conflict, there is also an except for documents (current or after the present disclosure), which are available in the present disclosure. It should be noted that, if there is any inconsistency or conflict between the descriptions, definitions and/or use of terms in the accompanying materials of the specification and the contents of the specification, the descriptions, definitions and/or use of terms in this specification shall prevail.

Finally, it should be understood that the embodiments described in the present disclosure are intended to illustrate the principles of the embodiments of the present disclosure. Other deformations may also belong to the scope of the present disclosure. Thus, as an example, not limited, the alternative configuration of the present disclosure embodiment can be consistent with the teachings of the present disclosure. Accordingly, the embodiments of the present disclosure are not limited to the embodiments of the present disclosure clearly described and described.

What is claimed is:

1. An Industrial Internet of Things (IoT) system for controlling a production line parameter, comprising: a user platform, a service platform, a management platform, a sensor network platform and an object platform interacting in sequence, wherein
   the service platform adopts a centralized arrangement; the management platform adopts an independent arrangement; the sensor network platform adopts a rear sub-platform arrangement; the independent arrangement is that the management platform uses different platforms for data storage, data processing, or data transmission for data of different object platforms; the rear sub-platform arrangement is that the sensor network platform is provided with a main platform and a plurality of sub-platforms, and the plurality of sub-platforms respectively store and process data of different types or different receiving objects sent by the management platform, and the main platform stores and processes the data of the plurality of sub-platforms after summarizing and transmits the data to the object platform; and the centralized arrangement is that the service platform uniformly receives data, uniformly processes data, and uniformly sends data; and
   the Industrial IoT system is configured to perform operations, comprising:
   configuring the object platform with a number of parallel production lines with a same configuration, each production line including a number of continuous production line equipment, and each production line equipment being equipped with a data collector;
   receiving, by the sensor network platform, working hour data of the production lines from the data collectors, and sending the working hour data to the management platform;
   classifying, by the management platform, the production line equipment into a plurality of workstations according to process positions of the production lines, determining working hour data of the plurality of workstations based on the working hour data of the production lines, determining production line balance rates based on the working hour data of the plurality of workstations, and sending the production line balance rates to the user platform through the service platform.

2. The Industrial IoT system according to claim 1, wherein to determine working hour data of the plurality of workstations based on the working hour data of the production lines, the management platform is configured to:

for each of the plurality of workstations,
extract working hour data of the workstation based on the working hour data of the production lines;
generate a weighted deviation rate of a working hour of the workstation;
adjust the working hour data of the workstation based on the weighted deviation rate of a working hour; and
determine the adjusted working hour data as final working hour data of the workstation, the final working hour data being used for determining the production line balance rates.

3. The Industrial IoT system according to claim 2, wherein to generate a weighted deviation rate of a working hour of the workstation, the management platform is configured to:

take a worker corresponding to the working hour data of the workstation as a worker to be assessed, take the workstation as a workstation to be assessed, and obtain working hour information of the worker to be assessed at different workstations, the different workstations being other workstations different from the workstation to be assessed;
obtain deviation rates of the working hours of the worker to be assessed at the different workstations, the deviation rates of the working hours being determined based on the working hours of the worker to be assessed at the different workstations and an average working hour of the different workstations;
generate feature vectors of the different workstations based on the skill features of the different workstations;
perform a weighted calculation on the deviation rates of the working hours of the worker to be assessed at the different workstations to determine a weighted deviation rate of the working hour of the worker to be assessed at the workstation to be assessed based on vector distances between a feature vector of the workstation to be assessed and the feature vectors of the different workstations.

4. The Industrial IoT system according to claim 2, wherein to generate a weighted deviation rate of a working hour of the workstation, the management platform is configured to take a worker corresponding to the working hour data of the workstation as a worker to be assessed, take the workstation as a workstation to be assessed, and obtain working hour information of the worker to be assessed at different workstations, the different workstations being other workstations different from the workstation to be assessed;
generate a deviation rate of the working hour of the worker to be assessed at a typical workstation based on a working hour of the worker to be assessed at a typical workstation and an average working hour of the typical workstation;
generate feature vectors of the typical workstation and the workstation to be assessed based on skill features of the typical workstation and the workstation to be assessed, respectively; and
determine a weighted deviation rate of the working hour of the worker to be assessed at the workstation to be assessed by processing a difference vector between the feature vectors of the typical workstation and the workstation to be assessed as well as the deviation rate of the working hour of the worker to be assessed at a typical workstation based on a neural network model.

5. The Industrial IoT system according to claim 4, wherein a type of the neural network model includes a convolutional neural network (CNN) model, a deep neural network (DNN) model, a recurrent neural network (RNN) model, a deep belief network (DBN) model.

6. The Industrial IoT system according to claim 1, wherein to determine production line balance rates based on the working hour data of the plurality of workstations, the management platform is further configured to:

generate a stack diagram by taking a count of workstations as a horizontal coordinate and a sum of the working hour data corresponding to the workstations as a vertical coordinate;
generate a bottleneck workstation time based on vertical coordinate data with the highest column in the stack diagram; and
generate the production line balance rate based on a sum of final working hour data of the workstations and total bottleneck workstation time, wherein the total bottleneck workstation time is determined based on the bottleneck workstation time and a count of workstations.

7. A control method of an Industrial Internet of Things (IoT) system for controlling a production line parameter, wherein the method is executed by the Industrial IoT system, the Industrial IoT system including a user platform, a service platform, a management platform, a sensor network platform, and an object platform interacting in sequence, wherein the service platform adopts a centralized arrangement; the management platform adopts an independent arrangement; the sensor network platform adopts a rear sub-platform arrangement; the independent arrangement is that the management platform uses different platforms for data storage, data processing, or data transmission for data of different object platforms; the rear sub-platform arrangement is that the sensor network platform is provided with a main platform and a plurality of sub-platforms, and the plurality of sub-platforms respectively store and process data of different types or different receiving objects sent by the management platform, and the main platform collects and stores and processes the data of the plurality of sub-platforms, and transmits the data to the object platform; and the centralized arrangement is that the service platform uniformly receives data, uniformly processes data, and uniformly sends data; and the method comprises:
configuring the object platform with a number of parallel production lines with a same configuration, each production line including a number of continuous production line equipment, and each production line equipment being equipped with a data collector;
receiving, by the sensor network platform, working hour data of the production lines from the data collectors, and sending the working hour data to the management platform;
classifying, by the management platform, the production line equipment into a plurality of workstations according to process positions of the production lines, determining working hour data of the plurality of workstations based on the working hour data of the production lines, determining production line balance rates based on the working hour data of the plurality of workstations, and sending the production line balance rates to the user platform through the service platform.

8. The control method according to claim 7, wherein the determining working hour data of the plurality of workstations based on the working hour data of the production lines includes for each of the plurality of workstations,
extracting working hour data of the workstation based on the working hour data of the production lines;
generating a weighted deviation rate of a working hour of the workstation;
adjusting the working hour data of the workstation based on the weighted deviation rate of a working hour; and
determining the adjusted working hour data as final working hour data of the workstation, the final working hour data being used for determining the production line balance rates.

9. The control method according to claim 8, wherein the generating a weighted deviation rate of a working hour of the workstation includes:

taking a worker corresponding to the working hour data of the workstation as a worker to be assessed, taking the workstation as a workstation to be assessed, and obtaining working hour information of the worker to be assessed at different workstations, the different workstations being other workstations different from the workstation to be assessed;
obtaining deviation rates of the working hours of the worker to be assessed at the different workstations, the deviation rates of the working hours being determined based on the working hours of the worker to be assessed at the different workstations and an average working hour of the different workstations;
generating feature vectors of the different workstations based on the skill features of the different workstations;
performing a weighted calculation on the deviation rates of the working hours of the worker to be assessed at the different workstations to determine a weighted deviation rate of the working hour of the worker to be assessed at the workstation to be assessed based on vector distances between a feature vector of the workstation to be assessed and the feature vectors of the different workstations.

10. The control method according to claim 8, wherein the generating a weighted deviation rate of a working hour of the workstation includes:

taking a worker corresponding to the working hour data of the workstation as a worker to be assessed, taking the workstation as a workstation to be assessed, and obtaining working hour information of the worker to be assessed at different workstations, the different workstations being other workstations different from the workstation to be assessed;
generating a deviation rate of the working hour of the worker to be assessed at a typical workstation based on a working hour of the worker to be assessed at a typical workstation and an average working hour of the typical workstation;
generating feature vectors of the typical workstation and the workstation to be assessed based on skill features of the typical workstation and the workstation to be assessed, respectively; and
determining a weighted deviation rate of the working hour of the worker to be assessed at the workstation to be assessed by processing a difference vector between the feature vectors of the typical workstation and the workstation to be assessed as well as the deviation rate of the working hour of the worker to be assessed at a typical workstation based on a neural network model.

11. The control method according to claim 10, wherein a type of the neural network model includes a convolutional neural network (CNN) model, a deep neural network (DNN) model, a recurrent neural network (RNN) model, a deep belief network (DBN) model.

12. The control method according to claim 7, wherein the determining production line balance rates based on the working hour data of the plurality of workstations includes:

generating a stack diagram by taking a count of workstations as a horizontal coordinate and a sum of the working hour data corresponding to the workstations as a vertical coordinate;
generating a bottleneck workstation time based on vertical coordinate data with the highest column in the stack diagram; and
generating the production line balance rate based on a sum of final working hour data of the workstations and total bottleneck workstation time, wherein the total bottleneck workstation time is determined based on the bottleneck workstation time and a count of workstations.

\* \* \* \* \*